No. 855,805. PATENTED JUNE 4, 1907.
A. F. PIEPER.
GOVERNOR FOR ELECTRIC MOTORS.
APPLICATION FILED SEPT. 16, 1904.
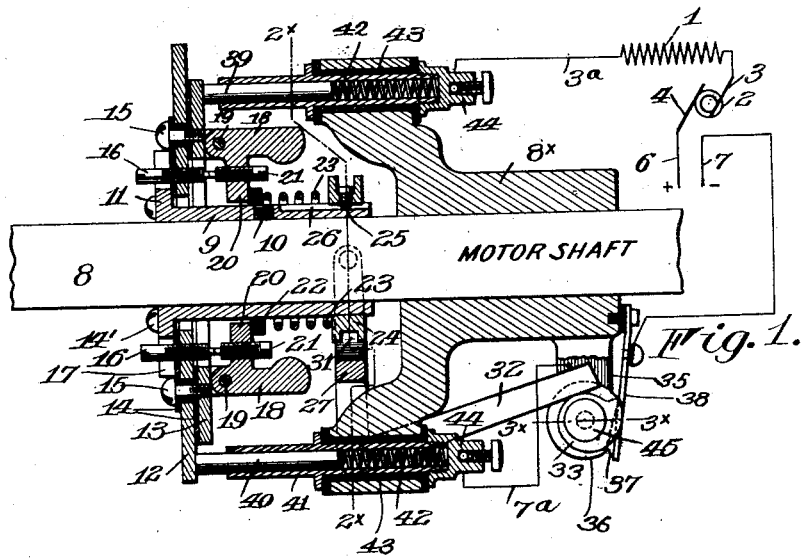
Fig. 1.
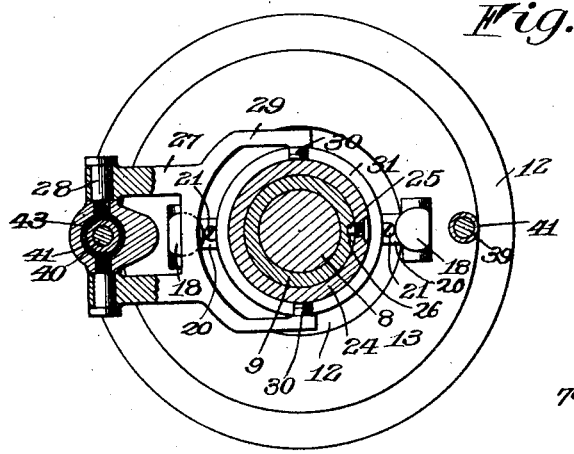
Fig. 2.
Fig. 3.
Witnesses
Walter B. Payne.
Russell B. Griffith
Inventor
Alphonse F. Pieper
By Frederick F. Church
his Attorney

UNITED STATES PATENT OFFICE.

ALPHONSE F. PIEPER, OF ROCHESTER, NEW YORK.

GOVERNOR FOR ELECTRIC MOTORS.

No. 855,805. Specification of Letters Patent. Patented June 4, 1907.

Application filed September 16, 1904. Serial No. 224,632.

*To all whom it may concern:*

Be it known that I, ALPHONSE F. PIEPER, of the city of Rochester, in the county of Monroe and State of New York, have invented certain new and useful Improvements in Governors for Electric Motors; and I do hereby declare the following to be a clear, full, and exact description of the same, reference being had to the accompanying drawings, forming a part of this specification, and to the reference-numerals marked thereon.

My present invention has for its object to provide a governor for electric motors whereby the speed of the armature or rotary operating part may be automatically regulated by controlling the flow of the operating current.

To these and other ends the invention consists in certain improvements and combinations of parts all as will be hereinafter more fully described the novel features being pointed out in the claims at the end of the specification.

In the drawings: Figure 1 is a longitudinal sectional view of a governor constructed in accordance with my invention showing its application to an armature shaft and diagrammatically illustrating the connections between it and the motor windings. Fig. 2 is a cross sectional view on the line $2^\times 2^\times$ of Fig. 1. Fig. 3 is a detail sectional view on the line $3^\times 3^\times$ of Fig. 1.

Similar reference numerals in the several figures indicate similar parts.

Inasmuch as a governor constructed in accordance with my invention is applicable to, and may be used in connection with, motors of any desired construction or peculiarities of windings either in the field or armature coils, I have simply shown in Fig. 1 a diagrammatic arrangement of the motor in which 1 illustrates the field, 2 the commutator, of the armature, with which the brushes 3 and 4 coöperate. The current for operating the motor may be supplied from any suitable form of generator over the line wires 6 and 7.

The armature, of which the commutator 2 is a part, is supported upon the shaft 8, one end of which is carried in a bearing or journal box $8^\times$, and the governor is operated by the rotary movement of the shaft and for convenience, it is preferably mounted thereon in proximity to the bearing $8^\times$. In the present embodiment of my invention I provide upon the shaft a sleeve 9 rigidly connected thereto by a set screw 10, or other fastening device, and provided at one end with a flange or collar 11, on which are supported annular bearing plates or rings 12 and 13 which are insulated from each other and also from the bearing and the sleeve 9 by insulations 14. In practice, these plates or rings are made of different diameter the larger being secured to the flange 11 by screws 14' while the smaller ring is connected to the larger one by screws 15. On the larger ring is a plurality of adjustable contact points in the form of screws 16 the outer ends of which project through recesses 17 in the flange 11 while their inner ends project through the central aperture in the ring 13. Arranged on the latter are a plurality of movable members comprising the arms 18 pivoted at their inner ends, as shown at 19, and having their outer weighted ends extending parallel to the axis of the shaft. These members are disposed around the shaft so as to balance each other, and each of them is provided with a laterally extending finger 20 carrying bearing screws 21 also forming adjustable contact points which are adapted to coöperate with and to normally engage the points formed by the screws 16 to close the circuit between the plates 12 and 13 as will be further described.

Surrounding the sleeve 9 is a movable collar 22 held in yielding engagement with the several fingers 20 by a coil spring 23 the outer end of which abuts against a ring 24 adjustable longitudinally to vary the tension of the spring and rotated by a key 25 engaging a way 26 in the collar 9. In order to permit this ring to be adjusted during the operation of the motor I provided a yoke frame 27, pivoted on studs 28, on a stationary portion of the motor frame, and having the arms 29 provided with pins or rollers 30 entering a groove or channel 31 in the ring, said frame being provided with an operating arm 32 the end of which bears against a cam 33, on a shaft 34. The latter extends transversely of the shaft 8 and is supported in bearings 35 and also arranged thereon is a segmental wheel or member 36 provided at one side with a flat face 37 coöperating with a leaf spring or contact member 38 to which the feed wire or conductor 7 is connected, the arrangement of the face 37 and the cam 33 being such that when the latter is adjusted to reduce the tension of the spring 23 to the lowest desirable point, the contact finger 38 will be disengaged to positively break the supply circuit. At each side of the journal box 8 are laterally extending arms supporting brushes 39 and 40, the former of which engages the plate 13 while the latter coöperates with the plate 12. These brushes may be of the usual or any preferred construction, and in the present illustration I have shown them as cylindrical and supported in holders 41 from which they are projected by coil springs 42, said holders being insulated from their supports by insulation 43 and provided at their rear ends with binding posts 44. The brush 39 is connected by the conductor 3ª to the commutator brush 3 and the brush 40 is connected to the contact wheel 36 by a conductor 7ª, which for convenience may be attached to one of the bearings 35 in which the shaft 34 is supported.

When the parts are in normal position and the shaft 34 is rotated by means of the operating knob or handle 45, to close the main circuit, the current will flow through the main conductor 7, contacts 38, 36, parts 34 and 35 and conductor 7ª to the brush 40 and entering the plate 12 will pass through the several contacts 16 to the corresponding contacts 21, thence through the members 18, the plate 13, the brush 39 and conductor 3ª, commutator brushes 3 and 4 and through the field and armature coils to the main conductor 6. This circuit it will be seen exists only when the speed of the motor is such that the movable members are not operated to break the circuit between the contacts 16 and 21 and that if from any cause, the speed of the armature becomes excessive the centrifugal force imparted to the members 18 will cause them to move outwardly on their pivots 19, thus breaking the circuit and causing the speed of the motor to be reduced automatically.

In proportioning the cam 33 it is arranged to support the arm 32 in such a position that the governor will control the speed of the motor at the lowest point for practical operation and the first part of the cam is formed concentric with the shaft 34 so that the latter may be rotated sufficiently to move the member or wheel 36 into engagement with the finger 38 to first close the supply circuit without increasing the tension of the spring 23 which may be further adjusted, as desired, after the motor has been started at the lower speed.

The manner of regulating an electric motor which I have described is particularly adapted for use upon alternating current motors of that particular type known as single phase motors in which the field and armature windings are connected in series as it obviates the use of any form of resistance interposed in the supply circuit.

By employing a governor such as I have shown and described which is capable of adjustment during operation, I am enabled to regulate the current supplied to the motor so that the motor may be set to operate under a given load and if the latter is reduced the supply of current will be proportionately reduced or intercepted to prevent the motor from racing or attaining an excessive speed.

I claim as my invention:

1. The combination with an electric motor comprising a field and an armature and a supply circuit leading to the motor, of a governor operated by the armature, contacts arranged in the generator circuit and controlled by the governor and a switch also located in said circuit, a tension device coöperating with the governor and means for regulating the switch and simultaneously operating the tension device.

2. The combination with an electric motor comprising a field and an armature and a supply circuit leading to the motor, of a governor operated by the armature, contacts arranged in the supply circuit and controlled by the governor and a switch also located in said circuit, a tension device coöperating with the governor and mechanism for opening and closing the switch and also regulating the tension device.

3. The combination with an electric motor comprising a field, an armature and a shaft supporting it and a supply circuit leading to the motor, of a governor embodying insulated plates, contact brushes engaging the separate plates and arranged in the supply circuit, a movable member insulated from the shaft, a contact point carried thereby and connecting the plates and operating connections between the governor and armature shaft.

4. The combination with an electric motor comprising a field, an armature, an armature shaft and a supply circuit leading to the motor, of two insulated plates arranged on the shaft, contact brushes engaging the separate plates and arranged in the supply circuit, a movable member supported on one of the plates and a contact point carried by the member and normally engaging the other plate.

5. The combination with an electric motor comprising a field, an armature and a shaft supporting it and a supply circuit leading to the motor, of insulated plates arranged on the shaft, contact brushes engaging the separate plates and arranged in the supply circuit, a plurality of centrifugally operated movable members supported by the shaft and insulated therefrom and contact points carried thereby and normally connecting the plates.

6. The combination with an electric motor comprising a field, an armature and a shaft supporting it and a supply circuit leading to the motor, of insulated contact plates supported on the shaft and insulated therefrom, brushes engaging each of the plates and arranged in the supply circuit and a plurality of movable members supported by the shaft, contacts carried by the member and normally closing the circuit through the plates, a tension device coöperating with said members and means for adjusting it.

7. The combination with an electric motor comprising a field, an armature and a shaft supporting it and a supply circuit leading to the motor, of a sleeve on the shaft, annular insulated plates supported on the sleeve and brushes engaging each of the plates and arranged in the supply circuit, a contact point on one of the plates, a movable member pivoted on the other plate and a coöperating contact point carried thereon, a tension device engaging the movable member and means for adjusting it.

ALPHONSE F. PIEPER.

Witnesses:
G. WILLARD RICH.
RUSSELL B. GRIFFITH.